J. A. RAILEY.
Ditching-Machine.
No. 227,651. Patented May 18, 1880.
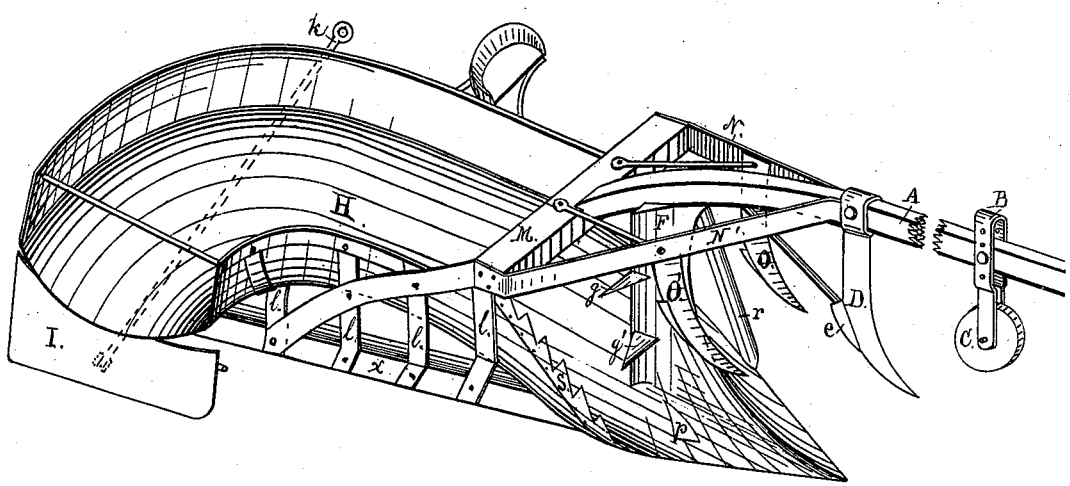
WITNESSES. INVENTOR.
Alfred W. J. Mason James A. Railey
BY H. N. Jenkins
ATTORNEY.

UNITED STATES PATENT OFFICE.

JAMES A. RAILEY, OF NEW ORLEANS, LOUISIANA.

DITCHING-MACHINE.

SPECIFICATION forming part of Letters Patent No. 227,651, dated May 18, 1880.

Application filed September 11, 1879.

*To all whom it may concern:*

Be it known that I, JAMES A. RAILEY, a resident of the city of New Orleans, parish of Orleans, and State of Louisiana, have invented a certain new and useful Improvement in Ditching-Machines; and I do hereby declare the following to be a full, clear, and correct description of the same, reference being had to the annexed drawing, making a part of this specification.

This machine is so constructed that it can be drawn through the soil either by animal or other power. It produces a neatly-trimmed ditch, the excavations from which are deposited along one side and at a given distance from the edge thereof.

My invention will be more readily understood by referring to the accompanying drawing, in which—

A represents a beam, to the forward end of which any desired form of clevis may be attached. In rear of the clevis is fitted an adjustable frame, B, in the lower end of which is pivoted a ground or regulating wheel, C. To the rear of this is secured a colter, D, having wings secured to the sides thereof, as at $e$, for the purpose of opening the earth, and thus lightening the pressure on the plow-standard F, which is likewise connected with the beam and provided at its lower end with a double plowshare and mold-board, the latter furnished with raised sides, the front edges of which incline rearward at an angle of about forty-five degrees, and flare outward to a sufficient extent to cause the knives $g$ $g'$, that are secured thereto, to trim the edges of the plow-cut.

The excavations are, by the forward movement of the machine, pressed backward through a conduit, H, the rear of which is curved either to the right or left, and raised sufficiently high to discharge above the surface of the soil and to one side of the cut made therein.

At the discharge end of the conduit is pivoted or hinged an apron, I, that is provided at its rear with a regulating-lever, (shown in dotted lines at $k$,) so as to discharge the loose earth away from the side of the ditch, and thus prevent its falling back therein.

The conduit is supported on one or more runners by means of braces $l$, and the rear end of the beam is bolted or otherwise secured to the tie-beam M, by which the upper portions of the sides are connected.

Braces N N' extend from each side of the beam to that portion of the sides to which the piece M is secured, and from thence downward along the sides of the conduit and its supports to the runner or runners $x$, as shown.

The knives, which are fitted to the sides, are made with straight cutting-edges, as at $r$, for cutting in ground that is free from roots, &c., and with saw-like edges, as at $s$, for ground in which roots are found.

In the construction of large machines extra colters are secured thereto, as at O O', and the mold-board and standards are furnished with side cutters or slashers, $p$.

The machine is drawn forward by hitching draft-animals thereto or by means of a windlass or steam-engines.

In the bottom and friction side of the conduit rollers may be fitted, so as to cause the excavations to move more freely to the rear.

Having described my invention, what I claim as new, and desire to secure by Letters Patent, is—

1. In a ditching-machine, the combination of a central cutting-standard, F, horizontal knives $g$, and conduit H, with cutting-edges, substantially as set forth.

2. In combination with the conduit H of a ditching-machine, the hinged or pivoted apron I and operating-lever $k$, substantially as described.

3. A ditching-machine consisting, essentially, of the advance colter D, with openers $e$, the plow-standard F, having horizontal side knives, $g$ $g'$, and conduit H, substantially as described.

In testimony whereof I have hereunto signed my name.

JAS. A. RAILEY.

In presence of—
P. J. FINNEY,
ALFRED W. J. MASON.